United States Patent [19]
Sato

[11] 3,798,429
[45] Mar. 19, 1974

[54] APPARATUS FOR INTEGRATING THE AREA OF A SUCCEEDING PEAK SUPERIMPOSED ON THE TAIL OF A PRECEDING PEAK IN THE OUTPUT OF A MEASURING INSTRUMENT

[75] Inventor: Tatsuo Sato, Kyoto, Japan

[73] Assignee: Shimadzu Seisakusho Ltd., Kyoto, Japan

[22] Filed: July 5, 1972

[21] Appl. No.: 269,211

[30] Foreign Application Priority Data
July 15, 1971 Japan.............................. 46-52617
Nov. 10, 1971 Japan.............................. 46-89646

[52] U.S. Cl. ....... 235/183, 235/92 NT, 235/151.35, 328/165
[51] Int. Cl. .......................... G06g 7/18, G06g 7/74
[58] Field of Search .......... 235/151.35, 183, 92 NT; 328/162, 165

[56] References Cited
UNITED STATES PATENTS

| | | | |
|---|---|---|---|
| 3,412,241 | 11/1968 | Spence et al. | 235/151.35 |
| 3,470,367 | 9/1969 | Frisby et al. | 235/151.35 |
| 3,475,600 | 10/1969 | Spence | 235/151.35 X |
| 3,555,260 | 1/1971 | Karohl | 235/151.35 |
| 3,614,408 | 10/1971 | Watkin et al. | 235/151.35 |
| 3,628,003 | 12/1971 | Spence | 235/151.35 |

Primary Examiner—Felix D. Gruber
Attorney, Agent, or Firm—Fidelman, Wolffe, Leitner and Hiney

[57] ABSTRACT

Apparatus for integrating the area of a succeeding peak superimposed on the tail of a preceding peak in the output of a measuring instrument. The apparatus comprises means for providing for the output of the instrument a temporary base line which has the slope of the tail at a point in the valley between the two peaks and which extends under the succeeding peak; means for integrating the area under the succeeding peak and above the temporary base line; means for calculating the excess of the integrated area caused by the temporary base line; and means for subtracting the excess area from the integrated area to obtain the area of the succeeding peak.

10 Claims, 8 Drawing Figures

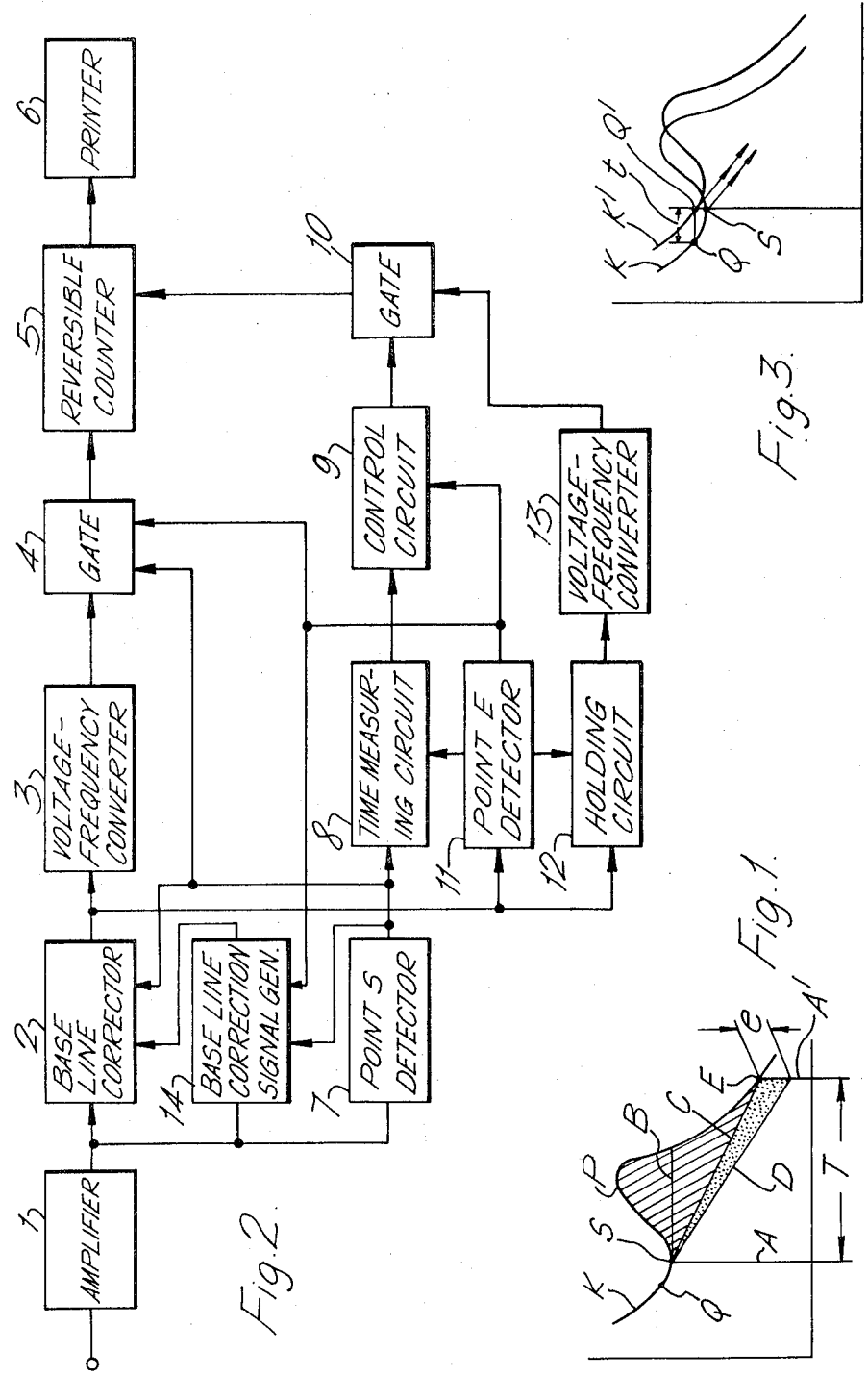

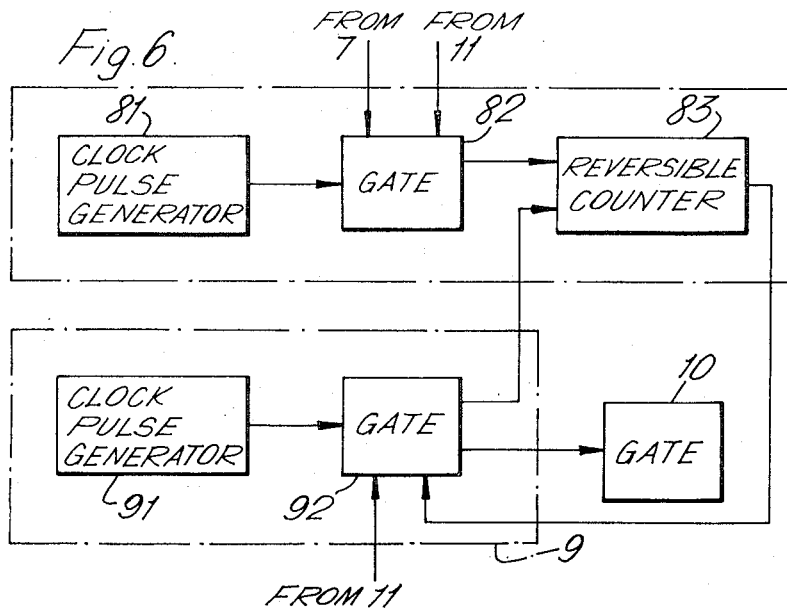
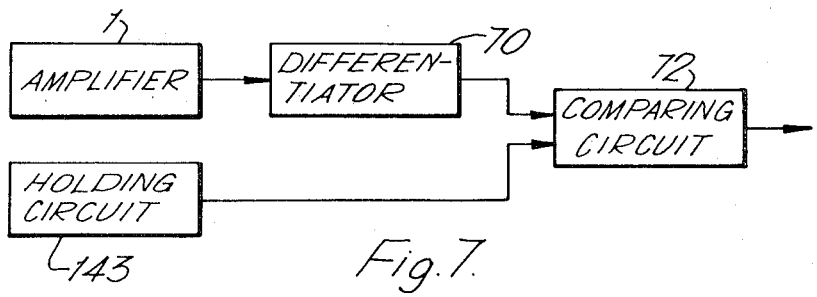
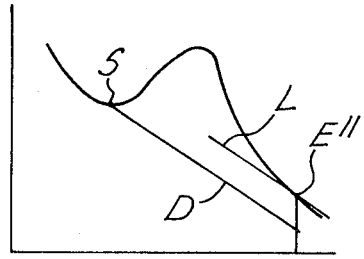

APPARATUS FOR INTEGRATING THE AREA OF A SUCCEEDING PEAK SUPERIMPOSED ON THE TAIL OF A PRECEDING PEAK IN THE OUTPUT OF A MEASURING INSTRUMENT

This invention relates to an apparatus for integrating the area of a peak in the output produced by a measuring apparatus such as a chromatograph in measurement of a sample.

Generally, the result of measurement by a chromatograph is indicated as a graphical curve including various peaks corresponding to the components of the measured sample. In such a curve it often occurs that the peak of the solvent in which the sample is dissolved for measurement has a long tail on which the peak of a sample component that first elutes is superimposed. For quantitive determination of the component constituting the latter peak, it is necessary to have a correct integration of the area of the peak as strictly separate as possible from the tail portion therebelow. To the best knowledge of the inventor there are not known any systems or methods for automatically effecting such correct integration.

It is therefore an object of the invention to provide an apparatus for automatically performing integration of the area of a peak in the output of a measuring instrument such as a chromatograph.

Another object of the invention is to provide such an apparatus as aforesaid which is capable of indicating the result of integration in a digital form.

Another object of the invention is to provide such an apparatus as aforesaid in a relatively simple construction.

The invention will be described in detail with reference to the accompanying drawings, wherein;

FIG. 1 is a graph of the output curve of a chromatograph for explanation of the principle of the invention;

FIG. 2 is a block diagram of one embodiment of the invention;

FIG. 3 is a graph for explanation of one method of obtaining the slope of the output curve at point Q in FIG. 1;

FIG. 6 is a detailed diagram of another portion of FIG. 2;

FIG. 7 is a block diagram of a circuit for detecting the end point E in FIG. 1; and FIG. 8 is a graph showing the principle of operation of the circuit of FIG. 7.

Figure 4:
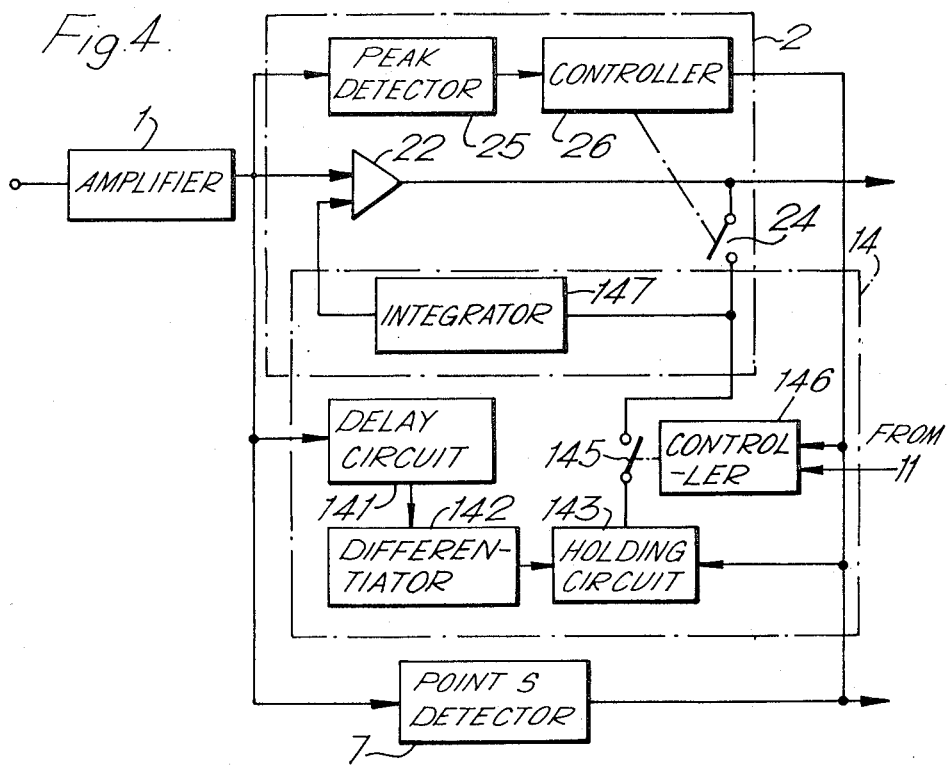
FIG. 4 is a detailed diagram of a portion of the diagram of FIG. 2.

Now referring to the drawings, first to FIG. 1, suppose that the recorder of a chromatograph measuring a sample dissolved in a solvent draws a curve K as shown having a long tail of an initial peak of the solvent with a peak P of a first component of the sample superimposed thereon. In order to measure the quantity of the sample component as expressed by the peak P, it is necessary to measure the area under the peak as indicated by hatching. In the prior art various methods have been proposed for the purpose. One of them is to measure the area below the peak P between vertical lines A and A'; another is to measure the area below the peak P and above a horizontal line B; and a third is to visually assume an extension C of the tail K from a point S thereon, and manually set in an integrator an inclined base line corresponding to the line C, and meaure the area below the peak P and above the line C. Although the first method can be carried out in a simple and easy manner, it is quite impossible with this method to determine the quantity of the sample component of the peak. The second method is relatively easy to perform and enables quantitative measurement to some extent. However, since the hatched portion below the line B is not taken into consideration, a considerably large error is introduced into the result of measurement. The third method of measuring the area above line C is indeed quite accurate but a very primitve method in that it requires the use of human senses and manual operations as above mentioned, that is, to visually assume the tail portion of the output curve concealed in the peak and set a corresponding inclined base line in the integrator. This is far from automatic calculation of the area below the peak of the sample component.

In accordance with the invention the area shown hatched below the peak P and above the line C in FIG. 1 can be automatically measured and calculated with a high degree of accuracy.

Turning to FIG. 2 which shows a block diagram of one embodiment of the invention, there is shown an amplifier 1 to which the output of a chromatograph not shown is applied. The amplified output is applied to a base line corrector 2 which operates to keep the base line of the amplifier normally at zero level. The amplified output voltage with its base line corrected by the corrector is applied to a voltage-frequency converter 3, which produces a series of pulses at the rate of one pulse per second per unit value of the voltage received from the amplifier. These pulses are applied through a gate circuit 4 to a reversible counter 5 to be counted thereby. It will be seen that the count attained by the counter 5 digitally expresses the integrated value of the output of the chromatograph. The integrated value is printed on a piece of paper by a printer 6.

The output from the amplifier 1 is also applied to a detector 7 which is adapted to detect the valley or lowest level point S of the curve before the peak P in FIG. 1. Upon detection of the point S, the detector 7 produces an output to open the gate 4.

The output from the amplifier 1 is also applied to a base line correction signal generator 14, which measures the slope of the tail at point Q a little time before point S and applies a corresponding correc-tion signal to the base line corrector 2. The base line correction signal is a voltage the value of which initially corresponds to the output of the amplifier at point Q and decreases at a predetermined rate as time elapses. Substantially the corrector 2 comprises a subtraction circuit, to which the correction signal from the circuit 14 is applied to be subtracted from the output of the amplifier directly applied to the corrector 2, so that the output from the corrector will correspond to the voltage of the peak P in FIG. 1 with the line D as its base line. This output voltage from the corrector 2 is converted by the voltage-frequency converter 3 to a corresponding number of pulses, which are applied to the counter 5 for integration when the gate 4 is opened by the point-S-detection signal from the detector 7.

The point-S-detection signal is also simultaneously applied to a time measuring circuit 8, which is then actuated to measure time since commencement of the integration.

Another detector 11 is provided to detect the end point E of the peak P. When the point E has been detected, the detector 11 produces a signal to be applied to the time measuring circuit 8 to terminate its operation, whereupon the circuit 8 memorizes the time T elapsed between the two points S and E.

At point E the output voltage of the base line corrector 2 is equal to $e$ in FIG. 1, which is held in a holding circuit 12. The voltage $e$ is applied to a voltage-frequency converter 13, which produces a corresponding number of pulses at the rate of one pulse per second per unit value of the input voltage.

A control circuit 9 is connected to the output of the time measuring circuit 8 and is so designed as to cause a gate circuit 10 to open during a period of time half as long as time T memorized by the time measuring circuit 8, so that the pulses from the converter 13 may be passed through the gate 10 to the reversible counter 5 to be subtracted from the number of pulses applied thereto by the converter 3.

The pulses to be subtracted from the count in the counter 5 correspond to the amount of $eT/2$, which represents the area of the dotted triangle below the line C in FIG. 1. Since the count reached in the counter 5, that is, the number of the pulses applied thereto from the converter 3 from time S to E corresponds to the area under the peak P and above the line D, the hatched area of the peak P which is required to measure will result from the above subtraction. The reason why the line D does not coincide with line C but extends therebelow is that the line D has the slope of the trail curve at point Q before point S where the peak P of a sample component begins to rise. Since the line D is so drawn as to lie below the line C, the dotted triangular area in FIG. 1 must be subtracted from the area obtained as a result of integration in the counter 5.

In practice, the peak P in FIG. 1 is often immediately followed by another peak, so that if it takes half as long as a time as time T to obtain the dotted area, it would become impossible to measure the succeeding peak. Therefore, the calculation of the dotted area must be finished in as short a time as possible. To this end, the converter 13 may be so designed as to produce pulses at a frequency higher than the converter 3. For example, the converter 3 produces 100 pulses per second per unit value of the voltage received from the corrector 2, that is, 100 times the output frequency of the converter 3 which produces one pulse per second per unit value of the voltage applied thereto, while the control circuit 9 is so designed as to cause the gate 10 to open for 1/200 of the time T memorized by the time measuring circuit 8, that is to say, the gate 10 is kept opened for a period of T/200. Thus, it is possible to obtain the dotted area in 1/200 of the time T from the beginning S to the end E of the peak P.

Various important component parts of the above system will now be explained in detail. FIG. 3 illustrates a method suitable for obtaining the slope of the tail K at point Q. According to this method, a voltage K' is provided which lags or is horizontally displaced rightward by a certain period of time $t$ from the output voltage K produced by the chromatograph, so that when the point S on the curve K has been detected by the point S detector 7, the slope of the curve K' at point Q' is obtained, which is the same as the slope of the curve K at point Q. FIG. 4 shows an example of the circuit for performing this method. The output from the amplifier 1 in FIG. 1 is delayed by a delay circuit 141 for a period of time $t$ and then differentiated by a differentiator 142. It will be easily seen that the output voltage from the differentiator 142 expresses the slope of the curve K', and this output is of a negative value in the illustrated embodiment. When the point S on the curve K has been detected by the detector 7, the differentiated voltage is held by a holding circuit 143 until the end point E of the peak is detected. When the point S has been detected, a switch 145 is closed by a controller 146 a moment after a switch 24 is closed as will soon be described hereinafter, so that the differentiated voltage held by the holding circuit 143 is continuously applied to an integrator 147. The integrated output which linearly decreases as time passes is applied as the base line correction signal to the corrector 2. When the end point E of the peak is detected, the switch 145 is opened and the voltage held in the holding circuit 143 is removed for the circuit to be ready for the next operation.

As the point S detector 7 a conventional differentiator may be employed to detect the point S where the first differential coefficient of the curve K becomes zero. In this case, the point S where the integration of the peak area is started is the lowest point of the valley before the peak P. However, for the purpose of this invention the point S need not necessarily coincide with the lowest point, but it can also be any point near the lowest point. The term "point S" is used here in such a broad sense. The same is true with the end point E of the peak as will become clear hereinafter.

FIG. 4 also shows the detail of the base line corrector 2 in connection with the base line correction signal generator 14. The corrector comprises a differential amplifier 22 which produces an output corresponding to the defference between the two imputs applied thereto. Normally, that is, so long as there is no peak appearing in the output curve of the chromatograph, a switch 24 is kept closed while the switch 145 is kept opened, so that the output of the corrector 2 is kept at zero level. When the peak detector 25 detects a peak in the output of the amplifier 1, the switch 24 is opened by a controller 26. Under the condition, when the detector 7 has detected the point S, the switch 24 is closed for a moment to apply the output from the amplifier 1 to the integrator 147 thereby to raise the base line of the output of the corrector 2 to the level of the point S in FIG. 1, so that the output of the corrector 2 becomes zero at point S. The switch 24 is then opened and at the same time the switch 145 is closed, whereupon the previously-mentioned negative signal held in the holding circuit 143 is continuously applied to the integrator 147, so that the output from the integrator 147 linearly decreases as time passes. This linearly decreasing signal is continuously applied to the amplifier 22, to which the output from the amplifier 1 is also directly applied, so that the amplifier 22 produces an output which is plotted as a curve P in FIG. 5. It will be easily seen that the area below the curve P between points S and E' in FIG. 5 substantially corresponds to the area below the peak P and above the line D between points S and E in FIG. 1. In other words, the curve P in FIG. 5 expresses the output from the corrector 2 the base line of which has been corrected in accordance with the invention.

As previously mentioned, the time measuring circuit 8 measures and memorizes the time T between points S and E, that is, from the begining to the end of the peak P, and the control circuit 9 causes the gate 10 to be opened only for, say, 1/200 of time T. This arrangement is shown in detail in FIG. 6. The time measuring circuit 8 comprises a clock pulse generator 81 which produces a series of pulses at a predetermined frequency $f$ and a gate 82 which is opened by the point-S-detection signal from the detector 7 and closed by the point-E-detection signal from the detector 11. During the time T the gate 82 is kept opened, the pulses from the generator 81 are counted by a reversible counter 83. The control circuit 9 comprises a clock pulse generator 91 which produces a series of pulses at a frequency, say, 200 times as high as the frequency $f$ of the pulse generator 81, and a gate 92 which is opened by the point-E-detection signal from the detector 11. Upon opening of the gate 92 the pulses from the generator 91 are applied to the up-down counter 83 so as to be subtracted from the count (that is the number of pulses from the generator 81) memorized therein. When, as a result of the subtraction, the count in the counter 83 has become zero, the counter produces an output to close the gate 92. Since the frequency of the pulses from the generator 91 is 200 times that of the pulses from the generator 81, the time in which the count in the counter 83 becomes zero is 1/200 of the time T in which that count was previously reached in the counter. During the time (T/200) the gate 92 is opened, the gate 10 is opened, so that the pulses from the converter 13 are applied to the counter 5 for subtraction to be performed therein as previously mentioned.

Figure 5:
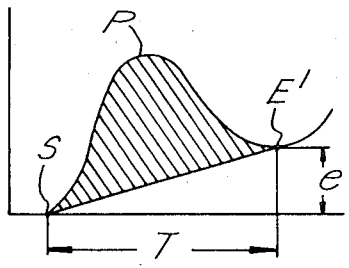
FIG. 5 is a graph showing the output curve of the circuit of FIG. 4.

Finally there are several ways of detecting the end point E of the peak P in FIG. 1. In the illustrated embodiment of FIG. 2 the lowest point E' at the right-hand side of the peak P in FIG. 5 is considered approximately as the end point E. Since FIG. 5 shows the output from the base line corrector 2, in order to obtain the lowest point E' the output from the corrector 2 may be differentiated so as to locate a point where the differential coefficient becomes zero.

Another arrangement suitable for determining the end point E is shown in FIG. 7, wherein the output from the amplifier 1 is applied to a differentiator 70 to provide a differentiated output to be applied to a comparator 72, to which the output from the holding circuit 143 (FIG. 4) is applied for comparison with the differentiated signal from the differentiator 70. As previously mentioned, the output from the holding circuit 143 expresses the slope of the tail at point Q or the slope of the line D in FIG. 1, while the differentiated output expresses the changing slope of a tangential line L to the curve P. Therefore when the two outputs agree, the two lines D and L lie parallel with each other as shown in FIG. 8, and the point E'' where the line L is then on the curve P may be considered as the point E.

Strictly speaking, the point E' or E'' does not coincide with the point E. However, the disagreement or discrepancy of the two points is practically negligible. To accurately locate the point E, a complicated arrangement would be required with a relatively low degree of accuracy for complexity of the arrangement. On the contrary, the above methods of this invention are much simpler with a higher degree of sensitivity and accuracy.

It has now become apparent that the objects of the invention can be fully attained by the apparatus of the invention as described above. It should be recognized, however, that although the illustrated embodiments have been explained in connection with a chromatograph, the invention is not restricted to the instrument but can be used with any other measureing instrument; and that the component parts of the apparatus can take various other forms than those illustrated within the scope of the invention.

What I claim is:

1. Apparatus for integrating the area of a succeeding peak superimposed on the tail of a preceding peak in the output of a measuring instrument comprising:

first means for detecting a valley point between said two peaks;

second means for detecting the end point of said succeeding peak;

third means for providing a base line correction signal, the level of which changes at a predetermined rate during a period of time T from said valley point to said end point;

fourth means for receiving the output of said measuring instrument and said base line correction signal to produce an output corresponding to the difference between said output of said measuring instrument and said base line correction signal;

fifth means for integrating the output of said fourth means during said period of time T;

sixth means for obtaining a value corresponding to $eT/2$ wherein T is said time, T and $e$ is the signal level of said output of said fourth means at said end point;

and seventh means for causing said value of $eT/2$ to be subtracted from said integrated output to obtain the area of said succeeding peak.

2. The apparatus of claim 1 wherein said third means comprises means for delaying the output of said measuring instrument; means for differentiating said delayed output; means for holding the value of said differentiated output when said valley point has been detected; and means for integrating said held value during said time T, so that the integrated value will be applied as said base line correction signal to said fourth means.

3. The apparatus of claim 1 wherein said end point detecting means comprises means for differentiating said output of said fourth means, and means for detecting the differentiated output becoming zero to produce an end point detection signal.

4. The apparatus of claim 1 wherein said end point detecting means comprises means for detecting agreement between the slope of the output of said measuring instrument and said predetermined rate of said base line correction signal.

5. The apparatus of claim 1 wherein said end point detecting means comprises means for differentiating the output of said measuring instrument, means for delaying the output of said measuring instrument, means for differentiating said delayed output, means for holding said differentiated delayed output when said valley point has been detected, and means for comparing said first differentiated output and said differentiated delayed output to produce an end point detection signal when said two outputs become equal.

6. The apparatus of claim 1 wherein said fifth means comprises a voltage-frequency converter for converting said output of said fourth means to a corresponding number of pulses, and a reversible counter for counting said pulses.

7. The apparatus of claim 6 wherein said sixth means comprises means for holding said output $e$ at said end point, a second voltage-frequency converter for converting said output $e$ to a corresponding number of pulses, means for providing a time $T'$ proportional to said time $T$, and means for applying said pulses to said reversible counter as a subtraction signal during said time $T'$.

8. The apparatus of claim 7 wherein said seventh means comprises a gate connected between the output of said second voltage-frequency converter and said reversible counter and also connected in controlled relation to said time providing means so as to be opened for said time $T'$ after lapse of said time $T$ so that said pulses from said second voltage-frequency converter are applied to said reversible counter to be subtracted from the number of said pulses counted by said reversible counter.

9. The apparatus of claim 8 wherein said second voltage-frequency converter produces said pulses at a frequency per unit value of the imput voltage a predetermined times the frequency of said pulses produced by said first voltage frequency converter.

10. The apparatus of claim 7 wherein said time providing means comprises a first clock pulse generator producing pulses, a first gate opened during said time $T$ to pass said pulses, and a reversible counter for counting said pulses during said time $T$ to memorize the number of said pulses, a second clock pulse generator, a second gate opened after lapse of said time $T$ to pass said pulses from said second pulse generator to said reversible counter so as to be subtracted from the count memorized in said counter till said count becomes zero, thereby providing said time $T'$.

* * * * *